United States Patent
Sethi et al.

(10) Patent No.: US 11,714,893 B2
(45) Date of Patent: Aug. 1, 2023

(54) ESCALATED AUTHENTICATION SYSTEM TO PERFORM AN INTEGRITY-CHECK BASED ON BEHAVIOR PATTERNS

(71) Applicant: EMC IP Holding Company LLC, Hopkinton, MA (US)

(72) Inventors: Parminder Singh Sethi, Punjab (IN); Madhuri Dwarakanath, Bangalore (IN); Bing Liu, Tianjin (CN); Srinath Kappgal, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 58 days.

(21) Appl. No.: 17/223,643

(22) Filed: Apr. 6, 2021

(65) Prior Publication Data
US 2022/0318361 A1   Oct. 6, 2022

(51) Int. Cl.
*G06F 21/36* (2013.01)
*G06F 21/40* (2013.01)

(52) U.S. Cl.
CPC ............... *G06F 21/36* (2013.01); *G06F 21/40* (2013.01)

(58) Field of Classification Search
CPC ........ G06F 21/316; G06F 21/36; G06F 21/40; G06F 21/31; G06F 11/3438; G06F 2221/2139; G06F 3/04812; H04L 67/535; H04L 63/105; H04L 63/1433; H04L 2463/082; H04L 63/10; H04W 12/06
See application file for complete search history.

(56) References Cited

U.S. PATENT DOCUMENTS

| | | | |
|---|---|---|---|
| 7,908,645 B2 * | 3/2011 | Varghese | G06F 21/552 715/833 |
| 9,338,622 B2 * | 5/2016 | Bjontegard | A63F 13/216 |
| 9,684,775 B2 * | 6/2017 | Gupta | H04L 63/1433 |
| 9,875,347 B2 * | 1/2018 | Baghdasaryan | G06F 21/316 |
| 11,301,550 B2 * | 4/2022 | Grajek | G06N 20/00 |
| 11,316,847 B1 * | 4/2022 | Alsolami | H04L 63/102 |
| 11,537,693 B2 * | 12/2022 | Solano | G06F 21/316 |
| 2008/0214153 A1 * | 9/2008 | Ramer | G06F 16/68 455/414.1 |
| 2010/0122329 A1 * | 5/2010 | Jakobsson | G06F 21/316 726/6 |
| 2012/0144492 A1 * | 6/2012 | Griffin | G06F 21/56 726/25 |
| 2017/0124328 A1 * | 5/2017 | Krishnapura | G06F 21/57 |
| 2021/0152555 A1 * | 5/2021 | Djosic | H04L 63/1425 |
| 2021/0250362 A1 * | 8/2021 | Spurlock | G06F 21/10 |
| 2022/0107998 A1 * | 4/2022 | Freckleton | G01C 19/00 |

FOREIGN PATENT DOCUMENTS

WO    WO-2022130374 A1 *   6/2022   .......... G06F 11/3438

* cited by examiner

*Primary Examiner* — Lizbeth Torres-Diaz
(74) *Attorney, Agent, or Firm* — Workman Nydegger

(57) ABSTRACT

Aspects of the disclosure include an escalated authentication system based on user behavior patterns. A user's behavior pattern on a device is collected and/or learned. The collected or learned pattern can be compared to subsequent behavior patterns to determine whether the current user is genuine or suspicious. Users deemed suspicious are subject to increased authentication requirements, often on-the-fly.

16 Claims, 6 Drawing Sheets

| Standard Dataset | Scoring | Result | Action |
|---|---|---|---|
| • Which part of the image did the user pick first?<br>• Which part of the image did the user pick N-th?<br>• Which area is the user clicking in the image? (Left, right, or middle)<br>• Is he solving the image from middle or from the corners?<br>• The time taken on moving one image to the right location.<br>• How is the users' scroll, drag and drop, and mouse-click movements? | 4 or more parameters in the solving pattern matched the Standard Dataset pattern | Low | Use existing single-layer authentication |
| | Only 3 parameters in the solving pattern matched the Standard Dataset pattern | Medium | Enable dual-layer authentication |
| | 2 or lower parameters in the solving pattern matched the Standard Dataset pattern | High | Enable multi-layer authentication |

Figure 3

ESCALATED AUTHENTICATION SYSTEM TO PERFORM AN INTEGRITY-CHECK BASED ON BEHAVIOR PATTERNS

FIELD OF THE INVENTION

Embodiments of the present invention generally relate to computing system security and to authentication. More particularly, at least some embodiments of the invention relate to systems, hardware, software, computer-readable media, and methods for authentication operations including authentication operations based on user behavior.

BACKGROUND

Data protection and cyber-related risks are a substantial concern. Thousands of websites are hacked every day and a hacking attack occurs at least once a minute. As a consequence, security and accountability are some of the most important factors for consumer, commercial and enterprise products.

One aspect of data protection and cyber protection relates to authentication. Authentication generally refers to the process of verifying the identify of a user or of a device. Requiring a user to input their username and password is a common example of authentication. Other methods, such as multi-factor authentication, improve on this basic authentication, but make things more difficult for the end user. In multi-factor authentication, an authentication operation requires additional factors such as a one-time pin (OTP), a captcha, fingerprint or face recognition, or the like. Authentication systems can thus vary in their complexity, security level, and convenience.

Authentication systems, nonetheless, are an important feature of computing systems. More specifically, it is incumbent on entities to protect their systems, their connections, and their data and this is achieved, at least in part, using authentication systems. Although many different authentication systems exist, there is room for improvement.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3 discloses aspects of a standard dataset that can be used to adapt authentication systems or authentication requirements in real-time;

DETAILED DESCRIPTION OF SOME EXAMPLE EMBODIMENTS

Embodiments of the present invention generally relate to authentication systems and authentication operations. More particularly, at least some embodiments of the invention relate to systems, hardware, software, computer-readable media, and methods for performing adaptive authentication systems capable of escalating authentication requirements based on user behavior or user behavior patterns.

In general, example embodiments of the invention relate to an authentication system where the complexity or level of authentication is dependent on the input, user behavior, and/or user behavior patterns. This allows, for example, extra or higher authentication levels to be required for suspicious users. This further allows the authentication of a genuine user to remain simple while providing extra protection from suspicious users by, in real time, requiring additional authentication.

Generally, embodiments of the invention collect information representative of user's interaction with a computing device. The user interaction may include user behavior and user patterns. Alternatively, user patterns may be determined from the collected data. Once a user is associated with standard dataset, which may represent a user behavior or a user behavior pattern, embodiments of the invention are able to detect when a genuine user (i.e., the correct user of the machine) is using the computing device. At the same time, embodiments of the invention may also detect when a different user (i.e., a suspicious or unauthorized user) is using the computing device.

When a different user is detected or suspected, embodiments of the invention may increase authentication requirements. Advantageously, this allows authentication requirements to be changed on-the-fly. For example, if a user at a computing device exhibits behavior or demonstrates a pattern that is not consistent with the genuine user's behavior or pattern, that user is determined to be an unauthorized or suspicious user. The authentication level is thus increased and if the user attempts to login to a website or access another resource, embodiments of the invention can require increased levels of authentication. As a result, a user that is genuine (e.g., not deemed to be suspicious or unauthorized) may be subjected to a simple authentication process such as username/password. A user that is deemed to be suspicious or unauthorized may be required to complete multi-factor authentication or other more stringent authentication procedures. The suspicious user may also be denied access. In addition, alerts may be generated notifying, for example, an administrator that a suspicious user is on a specific device or machine.

Figure 1:
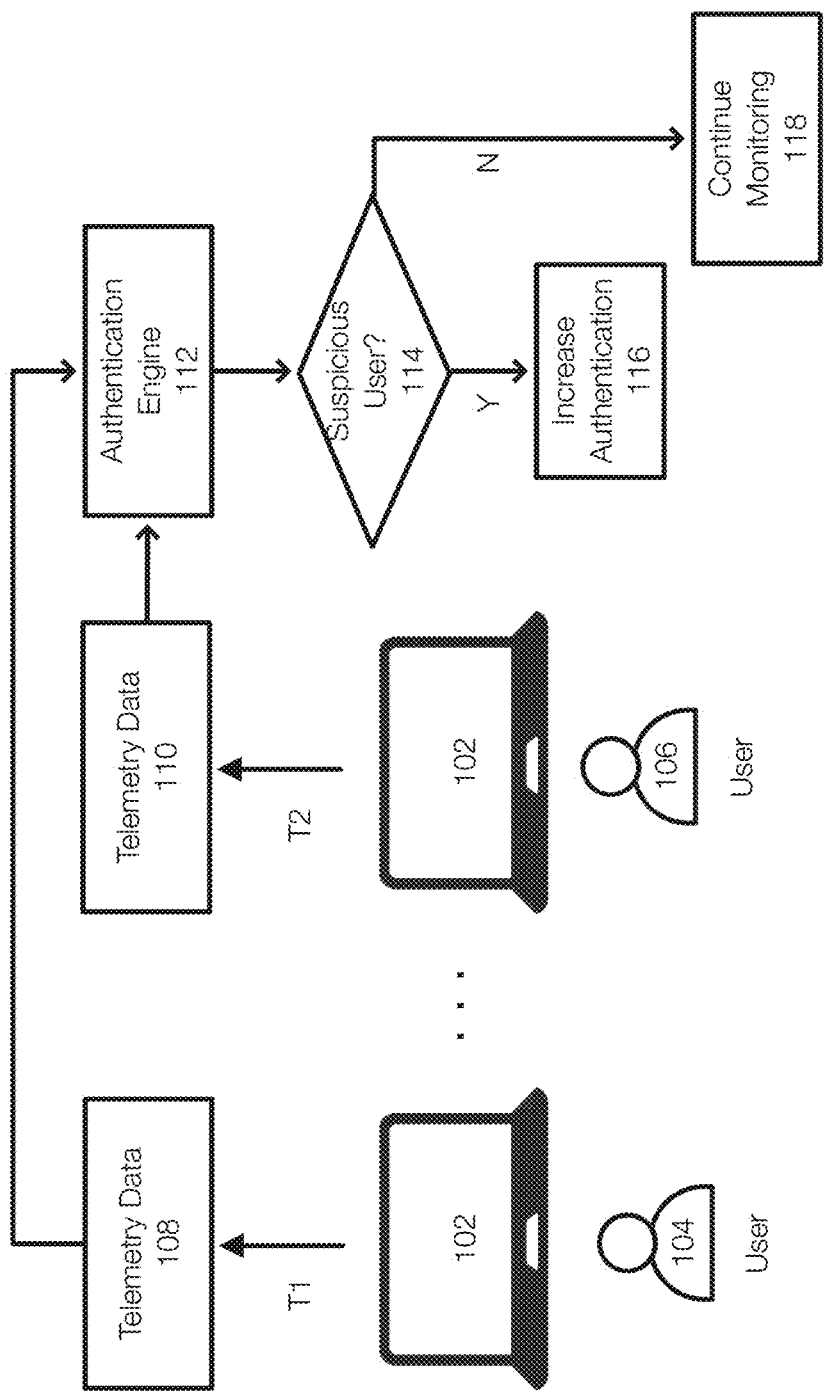
FIG. 1 discloses aspects of a computing environment in which authentication operations are performed.

FIG. 1 illustrates an example of a computing environment in which authentication operations may be performed. FIG. 1 illustrates a computing device 102 at two points in time, identifies as times T1 and T2. The device 102 may be any computing device and may include a processor, memory, networking hardware, and the like. The user 104 is the authorized or genuine user and this example assumes that the user 104 is registered (discussed with respect to FIG. 2).

At time T1, the user 104 may be using the device 102. In this example, telemetry data 108 for the user 102 may be collected. The telemetry data 108 may include mouse clicks, mouse movements, typing speed, mouse speed, drag and drop data, scroll movements, keyboard input, and the like or combination thereof. In one example, behavior features that change as the user experience becomes longer may not be collected.

The telemetry data 108 may be provided to an authentication engine 112, which may be a machine learning model, artificial intelligence, or logic that is configured to determine whether the user 104 is genuine or suspicious. If the authentication engine 112 is a machine model, previously collected data may be used to train the model. Thus, the authentication engine 112 receives telemetry data from the user 104 and/or other user data. The authentication engine 112, for example, may compare the current telemetry data 108 to telemetry data collected when the user 104 was registered with the authentication engine 112.

If the authentication engine 112 determines whether the user 104 is a suspicious user. If the user 104 is a suspicious user (Y at 114), then authentication requirements may be increased 116. If the authentication engine 112 indicates that the user 104 is not a suspicious user (N at 114), the collection of telemetry data and/or user monitoring may continue 118. The telemetry data 108 may be collected continuously, occasionally, for a period of time when use of the device 102 is detected and the like. At a time T2, telemetry data 110 is collected based on the current user, which is the user 106. In this example, the user 106 is suspicious (at least with respect to the device 102) and if the authentication engine 112 determines that the user 106 is suspicious (Y at 114), authentication may be increased.

For example, assume that the user 104 is logged in to the device 102 and then leaves the device 102. If the user 106 comes and begins using the device 102, the user 106 is suspicious. Embodiments of the invention can determine that the user 106 is suspicious and increase authentication requirements. Even if the user 106 has access to applications or resources that are already logged in, an alert can be generated. However, if the user 106 attempts to access a resource from the device 102 and authentication is required to access that resource, embodiments of the invention can increase the amount of authentication required on-the-fly and thus help protect data and other resources.

In another example, embodiments of the invention may be able to detect a suspicious user at login. A user may be presented with, by way of example only, a puzzle during login. If the user solves the puzzle in a similar manner to the manner during which a puzzle was solved during registration, the user may be subject to simple authentication. If the user is deemed suspicious based on the manner in which the puzzle was solved, additional authentication may be required.

Figure 2:
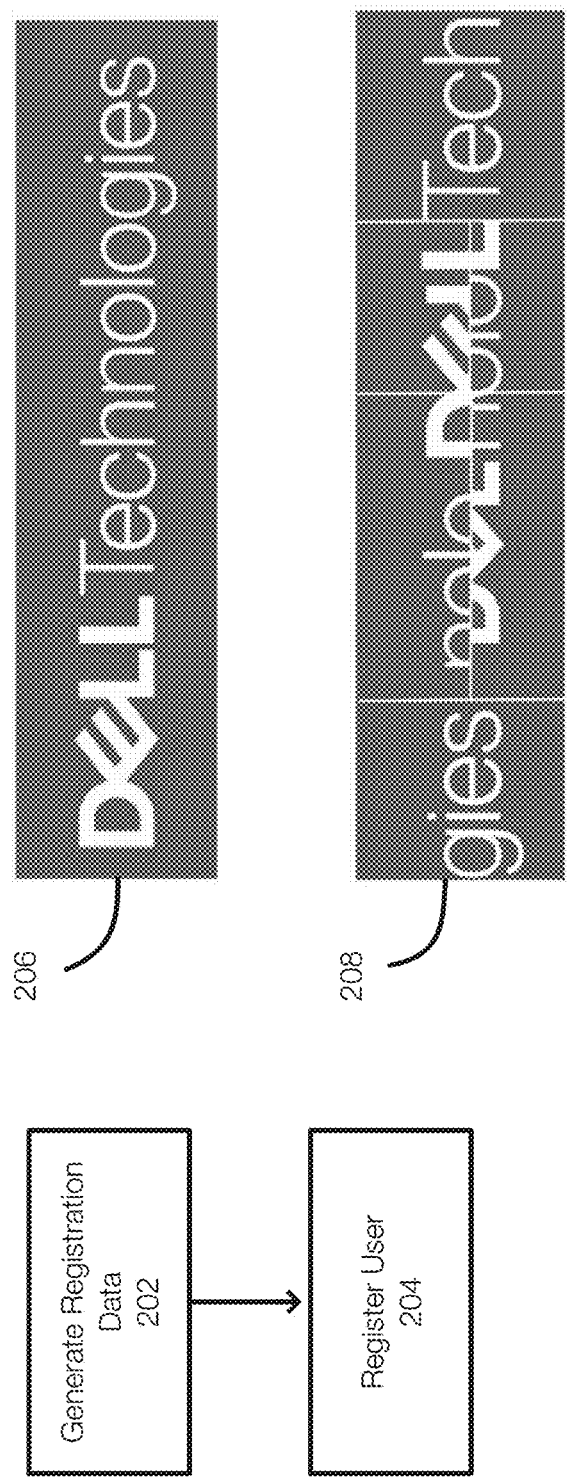
FIG. 2 discloses aspects of registering a user or a device with an authentication system.

FIG. 2 discloses aspects of registering a user. In this example, a user is registered by generating 202 registration data, which is an example of telemetry data. The telemetry data associated with registration is generated by requiring the user to perform a task or provide other input. The manner in which the task is performed or the manner in which input is provided is stored and may be a standard dataset at least for the user. The standard dataset reflect or includes a pattern reflecting the manner in which the task was performed by the user. The standard dataset may be updated or the generation of the standard dataset can be repeated or the like if necessary. In one example, a single instance of the telemetry data is sufficient to generate the standard dataset.

During registration, for example, a user may upload an image (user's choice), such as image 206, to the authentication engine. The authentication engine may generate a puzzle 208 from the uploaded image. Thus, the task to be performed by the user is to solve the puzzle. In this example, the result of the puzzle is known. Thus, the user is required to rearrange the puzzle pieces back into the original image, which is known to the user. In one example, the puzzle 208 is generated by breaking the image 206 into pieces and mixing the pieces up. Embodiments of the invention are not limited to puzzles, however, and may require other tasks from which a pattern or behavior can be determined.

The puzzle 208 is returned to the user and the user is requested to solve the puzzle 208 by rearranging the pieces to match the image originally uploaded. As the user solves the puzzle 208, telemetry data is collected and the standard dataset for the user is generated from the collected telemetry data.

The telemetry data collected as the user solves the puzzle 208 may include, but is not limited to, which piece of the puzzle 208 was selected first, which piece of the puzzle 208 was selected N-th, which area of the puzzle 208 is the user clicking in (e.g., left, right, middle), is the user solving the puzzle 208 from the middle or from the corners, time to move one piece to the correct location, information on the user's scroll, drag and drop, and click movements, or the like or combination thereof.

The telemetry data collected from the user solving the puzzle 208 may serve as a standard dataset for the user. Once the registration data is generated and the standard dataset is stored, the user is registered 204.

FIG. 3 discloses aspects of relationships between the standard dataset and authentication requirements. FIG. 3 illustrates a table 300 that associates the standard dataset with scoring, a result, and an action. For example, if, during a login attempt or at another time, 4 or more parameters match the standard dataset, low authentication is required. If only 3 parameters match the solving pattern, then dual-layer authentication may be required. If 2 parameters of less match the solving pattern in the standard dataset, multi-layer authentication may be enabled.

In one example, embodiments of the invention may be used during login as a method to determine what type of authentication to require. In another example, embodiments of the invention may be able to adapt or change the authentication level based on new telemetry data.

Embodiments of the invention can be based solely on the pattern determined from solving a single puzzle. However, embodiments of the invention may also employ machine learning to improve the ability to distinguish between an authorized user and an unauthorized or suspicious user. Further, machine learning may incorporate telemetry data collected from the user associated with applications or use of the computing device.

Figure 4:
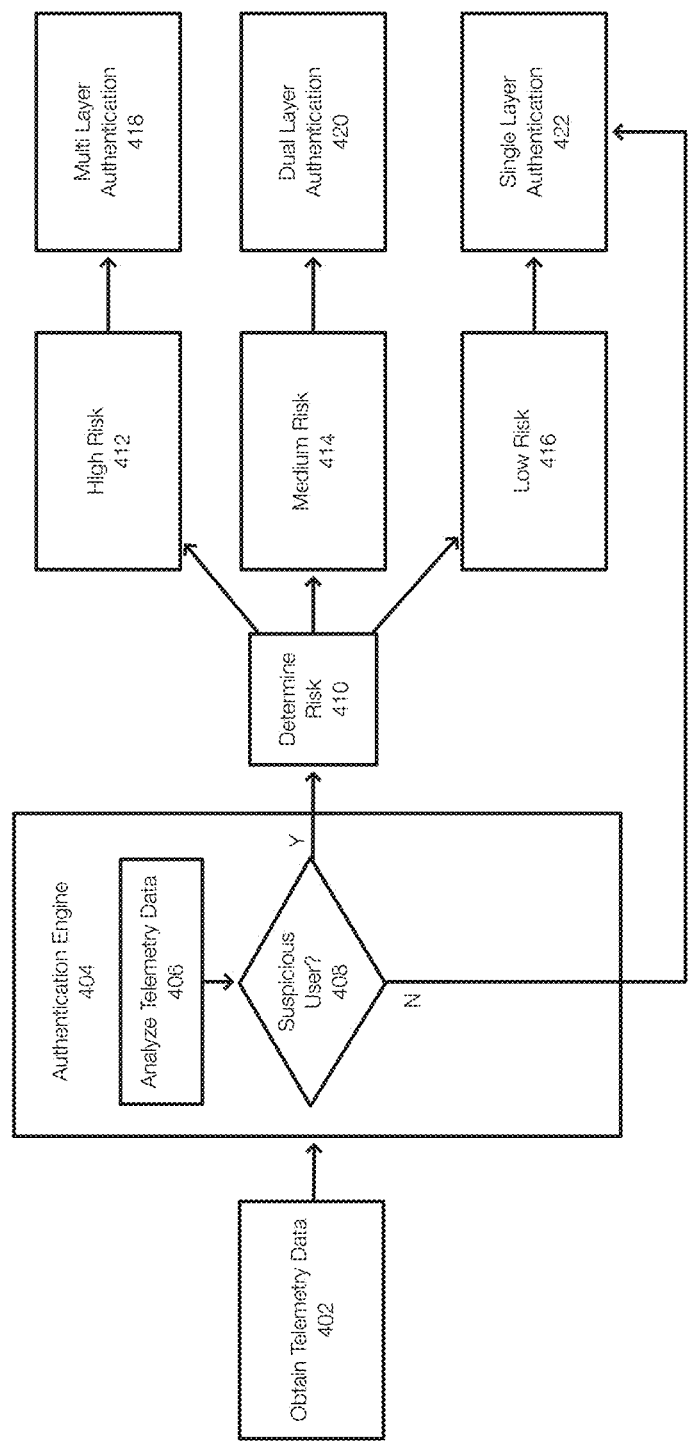
FIG. 4 discloses aspects of an authentication operation.

FIG. 4 discloses aspects of authentication operations. In this example, the user may have been registered as previously described such that a standard dataset exists. In one example, the user may be presented with a task and telemetry data is obtained 402. The collected telemetry data (e.g., new or current telemetry data) is evaluated or analyzed 406 by an authentication engine 404. The analysis may include comparing the telemetry data obtained at 402 to the standard dataset. If the user is determine to be a genuine user based on the comparison (N at 408), then only a single layer authentication (e.g., username/password) may be required.

If the analysis of the telemetry data indicates that the user is a suspicious user (Y at 408), the authentication engine 404 may determine 410 a risk level. This may depend on how the telemetry data compared with the standard dataset. By way of example only and not limitation, a good comparison (e.g., at least 4 matching parameters) may result in low risk 416 and single layer authentication 422. If only 3 matching parameters are found, the determined risk may be medium risk 414, which results in the application of dual layer authentication 420. If the determined risk 410 is high risk 412 (e.g., no more than 2 matching parameters), then multi-layer authentication 418 may be enabled. The threshold at which a particular risk is determined may vary and may depend on the number of total parameters.

For example, the current telemetry data indicates that the user selected the far right piece first and that the image was dragged to the right location in an appropriate amount of time. This may be an example of 3 matching parameters.

In one example, if the user is not a suspicious user (N at 408), the telemetry data may be added to the standard dataset or incorporated into the standard dataset. In addition, this may result in the collection over time of sufficient data for a training set for a machine learning model. This may allow the user to be deemed genuine or suspicious more effectively and efficiently over time.

Figure 5:
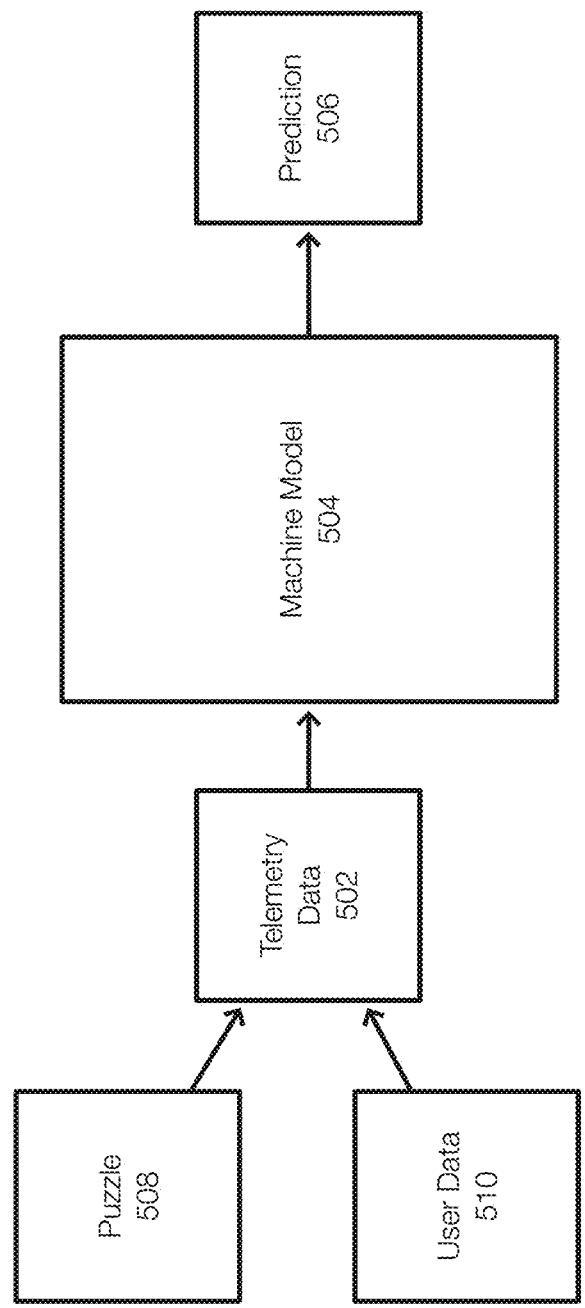
FIG. 5 discloses aspects of an authentication system configured to collect telemetry data and to determine a status of a user.

FIG. 5 discloses aspects of a machine learning model for screening users or for authenticating users. In FIG. 5, the telemetry data 502 used to train a machine model 504 may include the telemetry data from the puzzle 508 when the user was registered. User data 510 (telemetry data collected at subsequent logins or based on other usage of the device) may also be collected. This dataset (puzzle 508 and user data 510) can be used to train the machine model 504.

Once the machine model is trained, new telemetry data may be input to the trained machine model 504 to generate a prediction 506 as to whether the user is genuine or suspicious. The prediction 506 can be used to determine what level of authentication should be applied to the current user.

Embodiments of the invention thus allow for authentication procedures or requirements to be automatically changed in real time and on-the-fly. This may occur, by way of example, only, during an initial login attempt, during usage of a device when a change in user is detected, or the like or combination thereof.

In one example, embodiments of the invention may be performed in phases. During a first phase, user telemetry data is collected and may be used for registration. In the second phase, the standard dataset (based at least on the user telemetry data collected during registration) is used to pre-authenticate a user to understand if the user is genuine or suspicious. Even if the screening test determines that the user is a genuine user, the user is still required to authenticate. The screening test, however, may determine how the user authenticates. This allows existing authentication methods (single, dual, multi-factor authentication) to be used, but advantageously allows the least burdensome method to be used when possible.

In addition, the detection of a suspicious user at any time, not just at login, can be used to change any subsequently required authentications. For example, a user may login without determining whether the user is genuine or suspicious. After login, however, the collected telemetry data can be used to determine the user's status. Plus, embodiments of the invention may be used prior to the user logging in to the device.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, authentication related operations. Such operations may include telemetry data collection, puzzle solving, authentication adaptions, user monitoring, and the like or combination thereof. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example. Embodiments of the invention may also operate in containerized environments.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method comprising: collecting telemetry data related to an interaction between a user and a device, evaluating the collected telemetry data based on a standard dataset associated with a previous interaction between the user and the device, determining whether the user is a genuine user of a suspicious user based on the evaluation, and enforcing a first authentication when the user is deemed genuine and enforcing a second authentication when the user is deemed suspicious.

Embodiment 2. The method of embodiment 1, further comprising registering the user by collecting telemetry data for the standard dataset.

Embodiment 3. The method of embodiment 1 and/or 2, wherein registering the user includes receiving an image from the user, generating a puzzle from the image, and presenting the puzzle to the user.

Embodiment 4. The method of embodiment 1, 2, and/or 3, wherein the telemetry data for the standard dataset includes interactions between the user and the device as the user solves the puzzle.

Embodiment 5. The method of embodiment 1, 2, 3, and/or 4, wherein the interactions include one or more of: which part of the puzzle was selected first, which part of the puzzle was selected N-th, which area of the puzzle is the user clicking, is the user solving the puzzle from the middle or the corners, time taken on moving one piece to a correct location, and information related to scroll, drag and drop, and mouse click movements.

Embodiment 6. The method of embodiment 1, 2, 3, 4, and/or 5, further comprising determining that the user is suspicious when less than a threshold percentage of parameters from the collected telemetry data match the standard dataset.

Embodiment 7. The method of embodiment 1, 2, 3, 4, 5, and/or 6, further comprising, based on how the collected telemetry data matches the standard dataset, imposing a single layer authentication, a dual-layer authentication, or a multi-factor authentication.

Embodiment 8. The method of embodiment 1, 2, 3, 4, 5, 6, and/or 7, further comprising collecting additional telemetry data after an initial login and changing an authentication level on-the-fly when determining, from the additional telemetry data, that the user is suspicious.

Embodiment 9. The method of embodiment 1, 2, 3, 4, 5, 6, 7, and/or 8, further comprising performing machine learning on all collected telemetry data to predict to generate a machine model configured to predict whether the user is genuine or suspicious.

Embodiment 10. A method, comprising: collecting telemetry data while registering a user to generate a standard dataset, the telemetry data related to input of a user while solving a puzzle based on an image provided by the user, pre-authenticating the user based on new telemetry data and the standard dataset, and authenticating the user, wherein a level of authentication is based on how the new telemetry data matches the standard dataset.

Embodiment 11. The method of embodiment 10, further comprising setting a low authentication level when the new telemetry data meets or exceeds a threshold and setting a higher authentication level when the new telemetry data is below the threshold, wherein the threshold defines how the new telemetry data is supported by the standard dataset.

Embodiment 12. A method for performing any of the operations, methods, or processes, or any portion of any of these or combination thereof disclosed herein.

Embodiment 13. A non-transitory storage medium having stored therein instructions that are executable by one or more hardware processors to perform operations comprising the operations of any one or more of embodiments 1 through 12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads.

While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
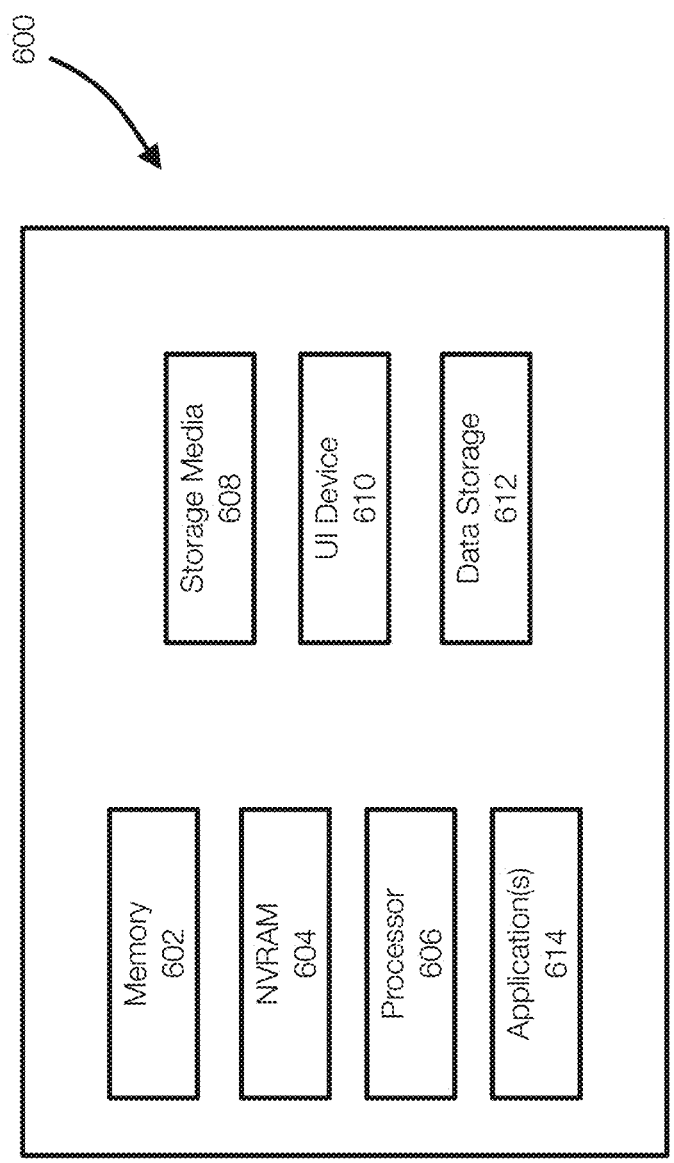
FIG. 6 discloses aspects of a computing device.

With reference briefly now to FIG. 6 any one or more of the entities disclosed, or implied, herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   collecting telemetry data related to an interaction between a user and a device;
   evaluating the collected telemetry data based on a standard dataset associated with a previous interaction between the user and the device;
   determining whether the user is genuine or suspicious based on the evaluation;
   enforcing a first authentication when the user is deemed genuine and enforcing a second authentication when the user is deemed suspicious;
   adding the collected telemetry data to the standard dataset to create an updated standard dataset;
   collecting additional telemetry data;
   determining whether the user is genuine or suspicious based on evaluating the additional telemetry data on the updated standard dataset; and
   increasing, based on the evaluation of the additional telemetry data, an authentication level on-the-fly when the user is determined suspicious.

2. The method of claim 1, further comprising registering the user by collecting telemetry data for generating the standard dataset.

3. The method of claim 1, wherein registering the user includes receiving an image from the user, generating a puzzle from the image, and presenting the puzzle to the user.

4. The method of claim 3, wherein the telemetry data for the standard dataset includes interactions between the user and the device as the user solves the puzzle.

5. The method of claim 4, wherein the interactions include one or more of:
   which part of the puzzle was selected first;
   which part of the puzzle was selected N-th;
   which area of the puzzle is the user clicking;
   is the user solving the puzzle from the middle or the corners;
   time taken on moving one piece to a correct location; and
   information related to scroll, drag and drop, and mouse click movements.

6. The method of claim 1, further comprising determining that the user is suspicious when less than a threshold percentage of parameters from the collected telemetry data match the standard dataset.

7. The method of claim 1, further comprising, based on how the collected telemetry data matches the standard dataset, imposing a single layer authentication, a dual-layer authentication, or a multi-factor authentication.

8. The method of claim 1, further comprising performing machine learning on all collected telemetry data to predict to generate a machine model configured to predict whether the user is genuine or suspicious.

9. A non-transitory storage medium having stored therein instructions that are executable by one or more hardware processors to perform operations comprising:
   collecting telemetry data related to an interaction between a user and a device;
   evaluating the collected telemetry data based on a standard dataset associated with a previous interaction between the user and the device;
   determining whether the user is genuine or suspicious based on the evaluation;
   enforcing a first authentication when the user is deemed genuine and enforcing a second authentication when the user is deemed suspicious;
   adding the collected telemetry data to the standard dataset to create an updated standard dataset;
   collecting additional telemetry data;
   determining whether the user is genuine or suspicious based on evaluating the additional telemetry data on the updated standard dataset; and
   increasing, based on the evaluation of the additional telemetry data, an authentication level on-the-fly when the user is determined suspicious.

10. The non-transitory storage medium of claim 9, further comprising registering the user by collecting telemetry data for the standard dataset.

11. The non-transitory storage medium of claim 9, wherein registering the user includes receiving an image from the user, generating a puzzle from the image, and presenting the puzzle to the user.

12. The non-transitory storage medium of claim 11, wherein the telemetry data for the standard dataset includes interactions between the user and the device as the user solves the puzzle.

13. The non-transitory storage medium of claim 12, wherein the interactions include one or more of:
   which part of the puzzle was selected first;
   which part of the puzzle was selected N-th;
   which area of the puzzle is the user clicking;
   is the user solving the puzzle from the middle or the corners;
   time taken on moving one piece to a correct location; and
   information related to scroll, drag and drop, and mouse click movements.

14. The non-transitory storage medium of claim 9, further comprising determining that the user is suspicious when less than a threshold percentage of parameters from the collected telemetry data match the standard dataset.

15. The non-transitory storage medium of claim 9, further comprising, based on how the collected telemetry data matches the standard dataset, imposing a single layer authentication, a dual-layer authentication, or a multi-factor authentication.

16. The non-transitory storage medium of claim 9, further comprising performing machine learning on all collected telemetry data to predict to generate a machine model configured to predict whether the user is genuine or suspicious.

* * * * *